United States Patent
Fukutomi et al.

(10) Patent No.: US 10,458,360 B2
(45) Date of Patent: Oct. 29, 2019

(54) SLIDING MEMBER AND METHOD OF MANUFACTURING THE SAME

(71) Applicants: TOYOTA JIDOSHA KABUSHIKI KAISHA, Toyota-shi, Aichi-ken (JP); DAICEL CORPORATION, Osaka-shi, Osaka (JP)

(72) Inventors: Ippei Fukutomi, Machida (JP); Naoya Ikeda, Toyota (JP); Kazuyoshi Manabe, Toyota (JP); Shinji Kikuchi, Amagasaki (JP)

(73) Assignees: TOYOTA JIDOSHA KABUSHIKI KAISHA, Toyota-shi, Aichi-ken (JP); DAICEL CORPORATION, Osaka-shi, Osaka (JP)

( * ) Notice: Subject to any disclaimer, the term of this patent is extended or adjusted under 35 U.S.C. 154(b) by 293 days.

(21) Appl. No.: 14/980,303

(22) Filed: Dec. 28, 2015

(65) Prior Publication Data

US 2016/0186684 A1    Jun. 30, 2016

(30) Foreign Application Priority Data

Dec. 25, 2014  (JP) .................................. 2014-263675

(51) Int. Cl.
  *F02F 3/00*  (2006.01)
(52) U.S. Cl.
  CPC .................................. *F02F 3/0015* (2013.01)
(58) Field of Classification Search
  CPC .................................................... F02F 3/0015
  See application file for complete search history.

(56) References Cited

U.S. PATENT DOCUMENTS

| 4,599,155 A | 7/1986 | Suzuki et al. | |
|---|---|---|---|
| 2002/0064599 A1* | 5/2002 | McAndrew | B05D 3/102 427/327 |
| 2002/0068237 A1* | 6/2002 | Imai | C08F 2/50 430/258 |
| 2004/0002559 A1* | 1/2004 | Troutman | C09D 5/185 524/100 |
| 2004/0186217 A1* | 9/2004 | Pelosi | C08L 29/14 524/505 |
| 2006/0142473 A1* | 6/2006 | Sunkara | C08G 18/4063 524/589 |

(Continued)

FOREIGN PATENT DOCUMENTS

| CN | 1499094 A | 5/2004 |
|---|---|---|
| CN | 101839188 A | 9/2010 |

(Continued)

OTHER PUBLICATIONS

An Office Action dated Sep. 28, 2017, which issued during the prosecution of U.S. Appl. No. 15/298,852.

(Continued)

*Primary Examiner* — Megan McCulley
(74) *Attorney, Agent, or Firm* — Sughrue Mion, PLLC

(57) ABSTRACT

A sliding member includes: a metal substrate; an undercoat primer layer that is formed on a sliding surface of the metal substrate; and a resin layer that is formed on the undercoat primer layer, in which the resin layer is formed by curing a composition layer containing a bifunctional alicyclic epoxy and a polymerization initiator.

14 Claims, 16 Drawing Sheets

(56) References Cited

U.S. PATENT DOCUMENTS

| | | | |
|---|---|---|---|
| 2006/0165973 A1* | 7/2006 | Dumm | B29C 33/56 |
| | | | 428/323 |
| 2007/0004598 A1* | 1/2007 | Maeda | C10M 169/044 |
| | | | 508/106 |
| 2007/0048531 A1* | 3/2007 | Nagaoka | C08J 7/04 |
| | | | 428/447 |
| 2007/0197756 A1* | 8/2007 | Ota | C08F 283/10 |
| | | | 528/28 |
| 2009/0051123 A1 | 2/2009 | Kariya et al. | |
| 2010/0236516 A1 | 9/2010 | Sasaki | |
| 2011/0268944 A1 | 11/2011 | Adam et al. | |
| 2012/0065296 A1 | 3/2012 | Fujimoto et al. | |
| 2015/0232620 A1 | 8/2015 | Sakane | |
| 2016/0032139 A1 | 2/2016 | Kikuchi et al. | |
| 2017/0130091 A1* | 5/2017 | Isobe | B05D 1/005 |

FOREIGN PATENT DOCUMENTS

| | | |
|---|---|---|
| CN | 104718233 A | 6/2015 |
| JP | 60-67531 A | 4/1985 |
| JP | 04241913 A | 8/1992 |
| JP | 07189804 A | 7/1995 |
| JP | 2004-278705 A | 10/2004 |
| JP | 2008-189853 A | 8/2008 |
| JP | 4911213 B2 | 4/2012 |
| JP | 2014-191173 A | 10/2014 |
| JP | 2014210412 A | 11/2014 |
| JP | 2015-052094 A | 3/2015 |
| WO | 2014/061648 A1 | 4/2014 |

OTHER PUBLICATIONS

"Should I Try a Leveling & Wetting Agent in My Coatings Formulation?", Available Jun. 7, 2015, PCI Magazine, URL: https://www.pcimag.com/articles/86108-should-i-try-a-levelingwetting-agent-in-my-coatings-formulation, accessed Jan. 3, 2018, total 9 pages.

Office Action dated Jan. 22, 2018, issued by USPTO in U.S. Appl. No. 15/298,852.

Advisory Action dated May 31, 2018 from the U.S. Patent and Trademark Office in U.S. Appl. No. 15/298,852.

Office Action dated Dec. 10, 2018 from U.S. Patent & Trademark Office in U.S. Appl. No. 15/298,852.

Final Office Action dated Apr. 1, 2019 from the United States Patent and Trademark Office in U.S. Appl. No. 15/298,852.

Advisory Action dated Jul. 30, 2019 from the United States Patent and Trademark Office in application No. 15298852.

* cited by examiner

FIG. 5
| | BOUNCE FREQUENCY [Hz] | | |
|---|---|---|---|
| | 4 | 16 | 20 |
| EXAMPLE 1 | 0 | 0 | 0 |
| EXAMPLE 2 | 0 | * | 6.2 |
| COMPARATIVE EXAMPLE 1 | PEELING | PEELING | PEELING |
| COMPARATIVE EXAMPLE 2 | PEELING | PEELING | PEELING |
| COMPARATIVE EXAMPLE 3 | 1.7 | 2.7 | 2.6 |
| COMPARATIVE EXAMPLE 4 | 4.7 | 6.2 | 7.1 |
| COMPARATIVE EXAMPLE 5 | 0 | 0 | 0 |
| COMPARATIVE EXAMPLE 6 | 8.0 | 11.2 | 12.8 |
*: DEFORMED INTO CONVEX SHAPE AFTER FINISH OF TEST
FIG. 6A
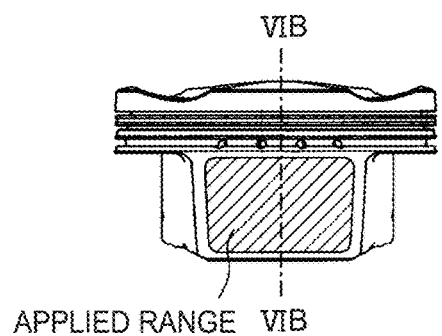
APPLIED RANGE   VIB
FIG. 6B
VIB-VIB SECTIONAL VIEW
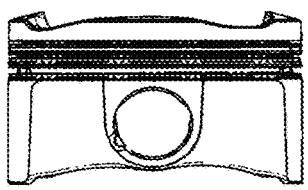

FIRST APPLIED RANGE
SECOND APPLIED RANGE

APPLYING TREATMENT IS PERFORMED

APPLYING TREATMENT IS PERFORMED

APPLIED RANGE

APPLIED RANGE

APPLIED RANGE

| | Ra | Ry | Rz |
|---|---|---|---|
| EXAMPLE 1 | 0.028 | 0.288 | 0.234 |
| EXAMPLE 2 | 0.027 | 0.270 | 0.222 |
| COMPARATIVE EXAMPLE 1 | 0.025 | 0.248 | 0.207 |
| COMPARATIVE EXAMPLE 2 | 0.029 | 0.301 | 0.244 |
| COMPARATIVE EXAMPLE 3 | 0.239 | 1.628 | 1.321 |
| COMPARATIVE EXAMPLE 4 | 0.027 | 0.273 | 0.222 |
| COMPARATIVE EXAMPLE 5 | 1.410 | 8.828 | 5.676 |
| COMPARATIVE EXAMPLE 6 | 0.037 | 0.405 | 0.289 |

SLIDING MEMBER AND METHOD OF MANUFACTURING THE SAME

INCORPORATION BY REFERENCE

The disclosure of Japanese Patent Application No. 2014-263675 filed on Dec. 25, 2014 including the specification, drawings and abstract is incorporated herein by reference in its entirety.

BACKGROUND OF THE INVENTION

1. Field of the Invention

The prevent invention relates to a sliding member and a method of manufacturing the same and, specifically, relates to an epoxy resin-based sliding member having a low friction coefficient and a method of manufacturing the same.

2. Description of Related Art

In the related art, in an internal combustion engine such as an engine or the like of an automobile, sliding members are used for various units including a piston skirt portion. Regarding these sliding members, various techniques have been developed in order to comply with, for example, CAFE standards for global environmental protection which state that energy loss is reduced through a reduction in friction coefficient.

On the other hand, along with changes in operation conditions which are frequently changed from engine start to constant-speed driving (that is, high-speed driving) through acceleration, a lubrication state between the units and members in contact with the units is shifted from a solid lubrication region during engine start to a boundary lubrication region (also referred to as "boundary region") during acceleration and is further shifted from the boundary region to a liquid lubrication region (also referred to as "liquid region") during constant-speed driving. It is necessary that a sliding member of an internal combustion engine such as an engine of an automobile satisfy not only properties required in the solid lubrication region and the boundary lubrication region but also properties required in the liquid lubrication region. That is, in the solid lubrication region, scuffing in which an unpleasant sound (for example, a rasping sound) is produced by collision between the units and other members in contact with the units needs to be suppressed; and in the liquid lubrication region, superior slidability is required. Therefore, for a sliding member, a film formed thereon needs to have heat resistance, and a reduction in the friction coefficient is required in the respective regions, in particular, in the solid lubrication region and the boundary lubrication region in which the lubrication state is unstable. As a sliding member satisfying these requirements, a DLC-based sliding member in which DLC is used as a film is proposed.

For example, Japanese Patent Application Publication No. 2004-278705 (JP 2004-278705 A) discloses a sliding member including: a hard carbon film that is a sliding surface; and a concave portion in which the depth distribution from the center of to an end portion of a direction, which is perpendicular to a sliding direction of the sliding surface, changes depending on the thickness distribution of an oil film. As a specific example, a sliding member including a hard carbon film, which is formed on a substrate surface by magnetron sputtering in which carbon is a target, is disclosed.

However, in the above-described technique of the related art, it is necessary to use a physical vapor deposition method for forming the DLC film. Therefore, productivity is low, high costs are inevitable, and thus it is difficult to obtain a sliding member having high productivity and a low friction coefficient.

SUMMARY OF THE INVENTION

The invention provides an epoxy resin-based sliding member having a low friction coefficient. The invention also provides a method of manufacturing an epoxy resin-based sliding member having a low friction coefficient.

According to an aspect of the invention, there is provided a sliding member including: a metal substrate; an undercoat primer layer that is formed on a sliding surface of the metal substrate; and a resin layer that is formed on the undercoat primer layer. The resin layer is obtained by curing a composition layer containing a bifunctional alicyclic epoxy and a polymerization initiator.

According to another aspect of the invention, there is provided a method of manufacturing a sliding member, the method including: a step of forming an undercoat primer layer on a sliding surface of a metal substrate; a step of providing a composition layer containing a bifunctional alicyclic epoxy and a polymerization initiator on the undercoat primer layer; and a step of curing the composition layer to form a resin layer.

According to the invention, an epoxy resin-based sliding member having a low friction coefficient can be obtained. According to the invention, an epoxy resin-based sliding member having a low friction coefficient can be easily obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a table showing the results of evaluating peeling resistance after a friction test regarding the samples of Examples and Comparative Examples;

FIG. 6A is a schematic front view showing an application example to a piston skirt portion;

FIG. 6B is a schematic sectional view taken along line VIB-VIB of FIG. 6A;

DETAILED DESCRIPTION OF EMBODIMENTS

In particular, for example, the invention can adopt the following embodiments.

1) In the sliding member, the bifunctional alicyclic epoxy may be 3,4,3',4'-diepoxybicyclohexyl represented by the following formula.

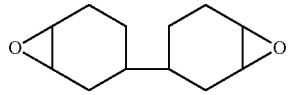 [SMILES: C1CC2OC2CC1C1CCC2OC2C1]

2) In the sliding member, the resin layer may further contain a leveling agent.

3) In the sliding member, a proportion of the leveling agent may be 5 parts by mass or lower with respect to 100 parts by mass of the bifunctional alicyclic epoxy.

4) In the sliding member, the metal substrate may be formed of aluminum, iron, an aluminum alloy or an iron alloy.

5) In the sliding member, the undercoat primer layer may have a thickness of 0.2 μm to 5 μm.

6) In the sliding member, the polymerization initiator may be a photoacid generator.

7) In the sliding member, the sliding member may be a piston skirt portion, a roller rocker portion, a chain damper portion, a cam nose portion, a valve lifter portion, or a cam bearing portion of an internal combustion engine.

Figure 1:
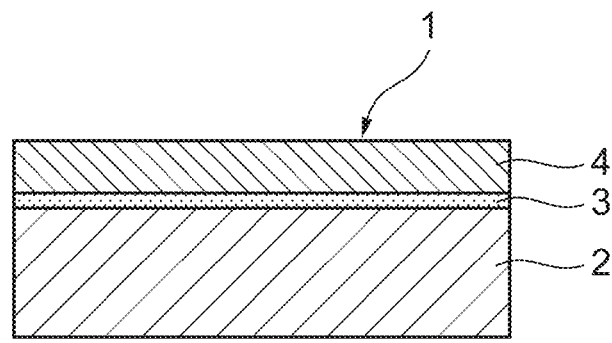
FIG. 1 is a schematic sectional view showing a sliding member according to an embodiment of the invention.

Hereinafter, an embodiment of the invention will be described with reference to the drawings. As shown in FIG. 1, a sliding member 1 according an embodiment of the invention includes: a metal substrate 2; an undercoat primer layer 3 that is formed on a sliding surface of the metal substrate 2; and a resin layer 4 that is formed on the undercoat primer layer. The resin layer is formed by curing a composition layer containing a bifunctional alicyclic epoxy and a polymerization initiator. The resin layer includes a polymer of a bifunctional alicyclic epoxy.

Figure 2:
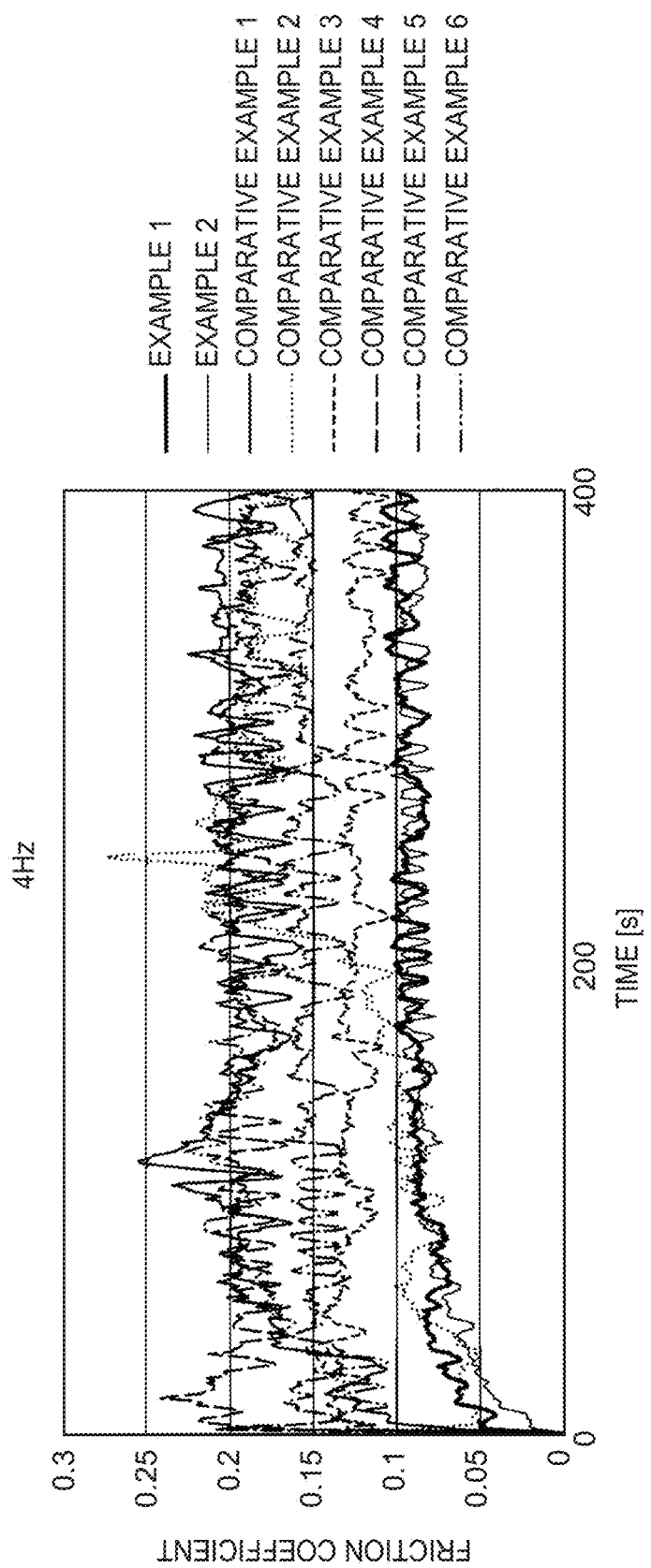
FIG. 2 is a graph showing the results of measuring a friction coefficient at 4 Hz regarding samples of Examples and Comparative Examples.
Figure 3:
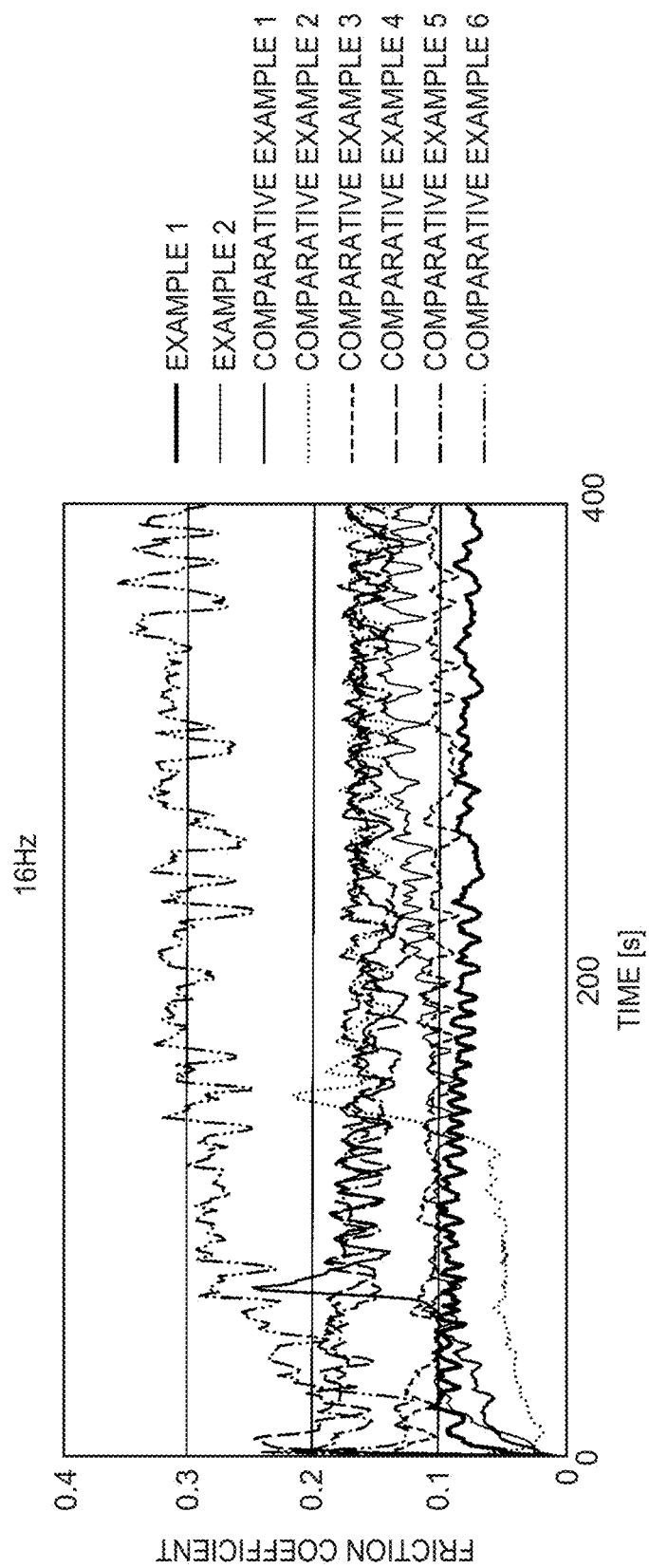
FIG. 3 is a graph showing the results of measuring a friction coefficient at 16 Hz regarding the samples of Examples and Comparative Examples.
Figure 4:
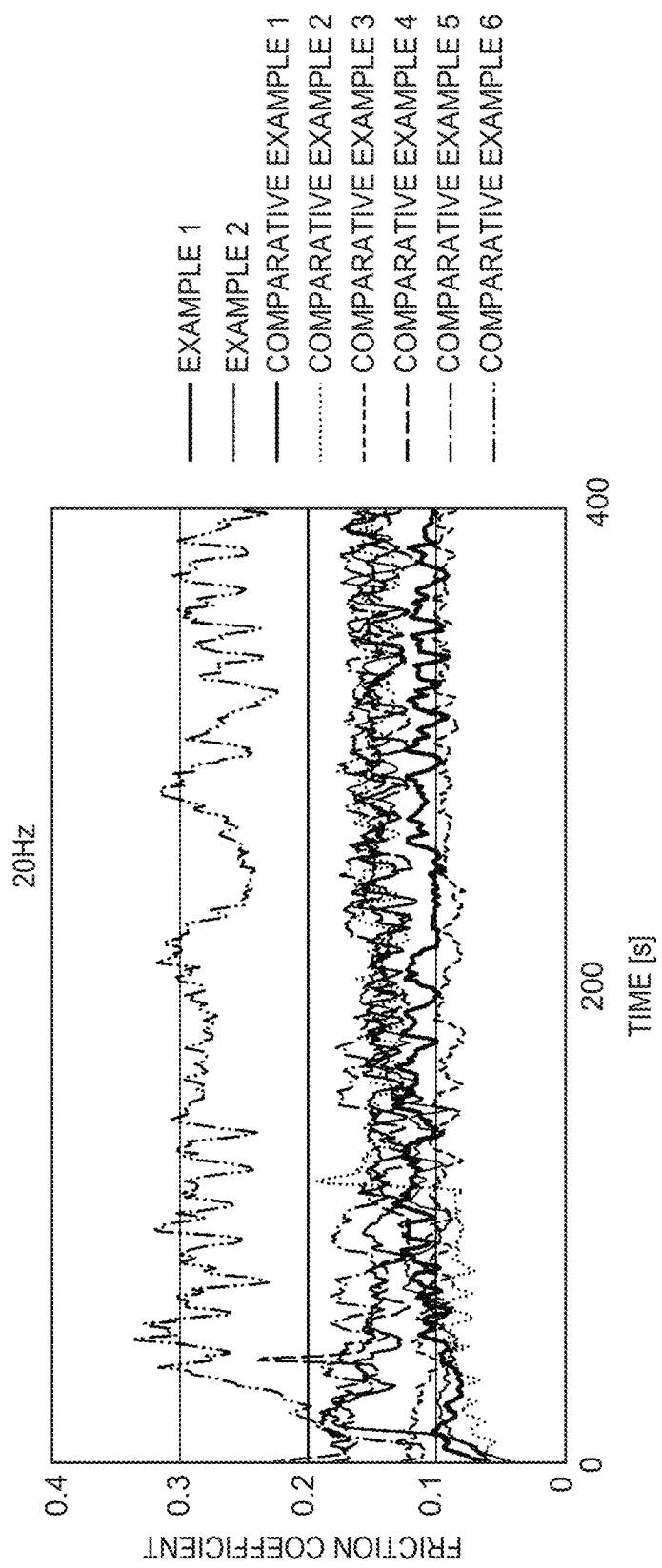
FIG. 4 is a graph showing the results of measuring a friction coefficient at 20 Hz regarding the samples of Examples and Comparative Examples.

The sliding member according to the embodiment of the invention having the above-described configuration has a low friction coefficient as shown in FIGS. 2 to 4. That is, when measured using a measurement method which is described below in detail in Examples, in a lubrication state at 4 Hz corresponding to a solid lubrication region and a lubrication state at 16 Hz corresponding to a boundary lubrication region and a liquid lubrication region, the friction coefficient of the sliding member according to the embodiment of the invention is ranked as B or higher based on the following evaluation criteria: rank A (friction coefficient: 0.1 or lower), rank B (friction coefficient: 0.1 to 0.15), and rank C (friction coefficient: 0.15 or higher). The sliding member according to the embodiment of the invention exhibits a low friction coefficient in the solid lubrication region and the boundary lubrication region in which the lubrication state of the sliding member is unstable. This result is very unexpected, and the sliding member according to the embodiment of the invention exhibits a significantly higher effect as compared to a case where the friction coefficient of a polyfunctional acrylate resin-based sliding member, which is outside of the scope of the invention, is ranked as C at 4 Hz and 16 Hz.

As shown in a table of FIG. 5, in the sliding member according to the embodiment of the invention, the peeling of the resin layer after the measurement using the above-described method of measuring a friction coefficient is not found. On the other hand, in the polyfunctional acrylate resin-based sliding member which is outside of the scope of the invention, a resin layer is peeled off after the measurement. The sliding member according to the embodiment of the invention has a low friction coefficient and peeling resistance, but the theoretical explanation for this effect is not sufficient. It is presumed that the effect is obtained by a combination of an undercoat primer layer with a resin layer which is formed by curing a composition layer containing a bifunctional alicyclic epoxy and a polymerization initiator or a composition layer containing a bifunctional alicyclic epoxy, a polymerization initiator, and a leveling agent.

Figure 7A:
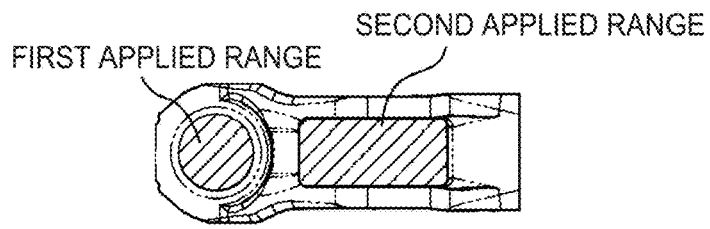
FIG. 7A is a schematic view showing an application example to a roller rocker portion.
Figure 7B:
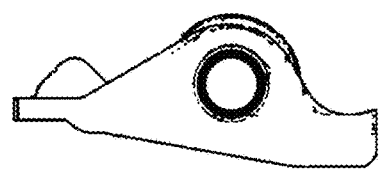
FIG. 7B is a schematic side view of FIG. 7A.
Figure 8A:
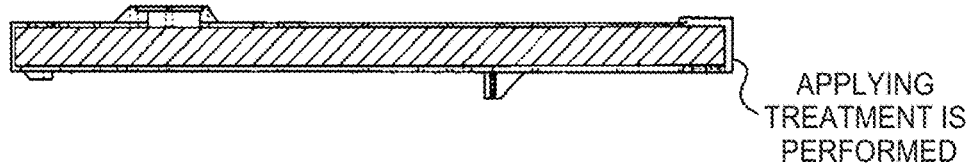
FIG. 8A is a schematic view showing an application example to a chain damper portion.
Figure 8B:
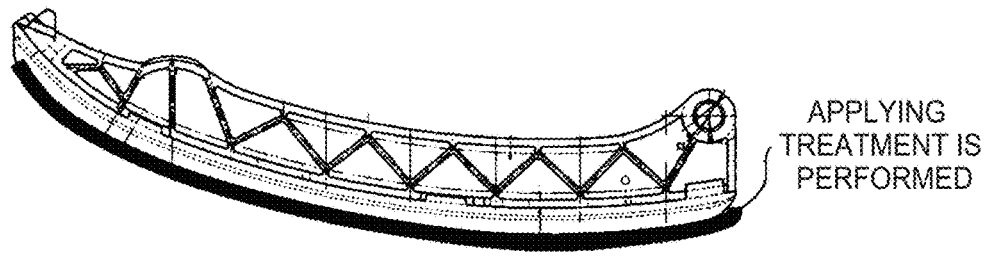
FIG. 8B is a schematic sectional view showing a part of FIG. 8A.
Figure 9A:
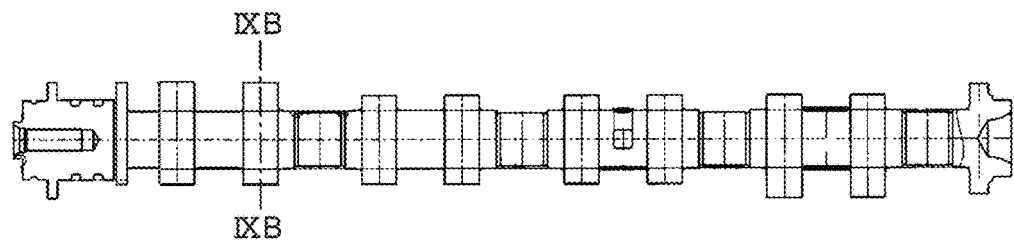
FIG. 9A is a schematic view showing an application example to a cam nose portion.
Figure 9B:
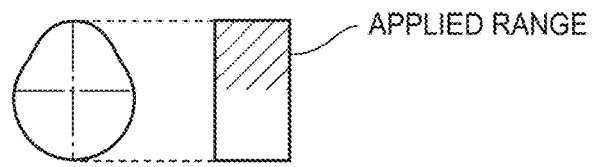
FIG. 9B is a schematic sectional view taken along line IXB-IXB of FIG. 9A.
Figure 10:
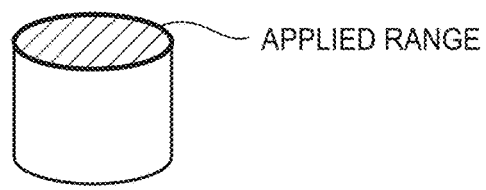
FIG. 10 is a schematic view showing an application example to a valve lifter portion.
Figure 11:
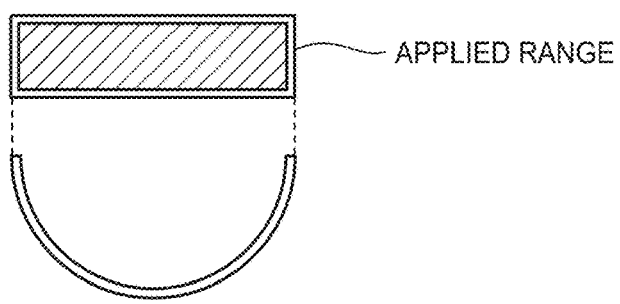
FIG. 11 is a schematic view showing an application example to a cam bearing portion.

For example, the sliding member according to the embodiment of the invention is applicable to various units including: a piston skirt portion shown in FIGS. 6A and 6B; a roller rocker portion shown in FIGS. 7A and 7B in which a film including the undercoat primer layer and the resin layer is applied to either or both of the first applied range and the second applied range; a chain damper portion shown in FIGS. 8A and 8B; a cam nose portion shown in FIGS. 9A and 9B; a valve lifter portion shown in FIG. 10; and a cam bearing portion shown in FIG. 11.

In the embodiment of the invention, the metal substrate is not particularly limited but may be typically formed of metal such as aluminum or iron. Aluminum or iron may be used alone, or an alloy of aluminum or iron containing another metal may be used. It is preferable that the metal substrate has a sliding surface which is a mirror surface. It is preferable that the sliding surface of the metal substrate has a Ra of 0.05 μm or less (for example, 0.03 μm or less). In consideration of the peeling resistance of the sliding member, it is preferable that Ra is 0.01 μm or more.

The undercoat primer layer may be formed by applying an undercoat primer to the sliding surface of the substrate and heating the undercoat primer. The thickness of the undercoat primer layer may be preferably 0.2 μm to 5 μm (for example, 0.2 μm to 3 μm; typically about 2 μm). In the embodiment of the invention, the undercoat primer layer is formed on the sliding surface of the metal substrate, and the resin layer is formed on the undercoat primer layer. As a result, the peeling resistance of the sliding member is improved. When the resin layer is formed directly on the sliding surface of the metal substrate without the undercoat primer layer being formed, a sliding member having the peeling resistance cannot be obtained.

For example, the undercoat primer may be obtained by mixing an epoxy resin, a curing initiator, and a solvent and optionally an inorganic powder with each other. The epoxy resin is a major component capable of obtaining an undercoat primer layer having superior affinity to the resin layer, which is formed on the undercoat primer layer, and superior heat resistance, and examples of the epoxy resin include bisphenol A type epoxy resins, bisphenol F type epoxy resins, cyclic oxirane type epoxy resins, glycidyl ether type epoxy resins, glycidyl ester type epoxy resins, polyglycol ether type epoxy resins, and glycol ether type epoxy resins. Examples of the curing initiator include cation curing initiators, imidazoles, hydrazides, anhydrides, liquid phenols, aromatic amines, and amine-epoxy adduct type compounds. Examples of the solvent include methyl isobutyl ketone (MIBK), tetrahydrofuran, toluene, and xylene. Examples of the inorganic powder include silica, titanium oxide, wollastonite, mica, talc, kaolin, and chromium oxide.

As the undercoat primer, a commercially available product can be used, and examples thereof include FC PRIMER AL, FC PRIMER EP, and RAYMAGIC 07 (all of which are manufactured by Kanae Paint co., Ltd.). Among these, one kind may be used, or a mixture of two or more kinds may be used. The undercoat primer layer may be formed by applying the undercoat primer to the sliding surface of the metal substrate and heating the undercoat primer.

In the embodiment of the invention, the resin layer formed on the undercoat primer layer is formed by curing a composition layer containing a bifunctional alicyclic epoxy and a polymerization initiator or a composition layer containing a bifunctional alicyclic epoxy, a polymerization initiator, and a leveling agent. The resin layer has a thickness of preferably 10 μm to 75 μm (for example, 15 μm to 50 μm; typically, about 40 μm).

As the bifunctional alicyclic epoxy, an epoxy represented by the following formula can be used.

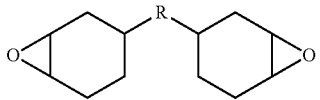

(In the formula, R represents a direct bond or a carboxy alkylene group represented by the following formula —CH$_2$—COO—, —(CH$_2$)$_2$—COO—, —(CH$_2$)$_3$—COO—, —(CH$_2$)$_4$—COO, —CH$_2$—COO—CH$_2$—OOC—CH$_2$—, —(CH$_2$)$_2$—COO—CH$_2$—OOC—(CH$_2$)$_2$—, —(CH$_2$)$_3$—COO—CH$_2$—OOC—(CH$_2$)$_3$—, or —(CH$_2$)$_3$—COO—(CH$_2$)$_2$—OOC—(CH$_2$)$_3$—.)

Examples of the bifunctional alicyclic epoxy include 3,4-epoxycyclohexylmethyl-3,4-epoxycyclohexane carboxylate, 6-methyl-3,4-epoxycyclohexylmethyl-6-methyl-3,4-epoxycyclohexane carboxylate, bis(3,4-epoxycyclohexylmethyl)oxalate, bis(3,4-epoxycyclohexylmethyl)adipate, bis(3,4-epoxy-6-methylcyclohexyl methyl)adipate, 2-(3,4-epoxycyclohexyl-5,5-spiro-3,4-epoxy)cyclohexane-m-dioxane, 1-epoxyethyl-3,4-epoxycyclohexane, 3,4,3',4'-diepoxybicyclohexyl, and 1,2,5,6-diepoxyhexahydroindan. Among these, 3,4,3',4'-diepoxybicyclohexyl is preferable. From the viewpoints of handleability and mixing properties, it is preferable that the bifunctional alicyclic epoxy is liquid at room temperature.

Examples of the polymerization initiator include a cation polymerization initiator, an azo-based initiator, a peroxide initiator, and a persulfate initiator. The proportion of the polymerization initiator varies depending on the kind of the polymerization initiator. With respect to 100 parts by mass of the epoxy, the proportion of a cation polymerization initiator is preferably 0.01 parts by mass to 10 parts by mass (for example, 0.1 parts by mass to 5 parts by mass), and the proportion of an azo-based initiator, a peroxide initiator, or a persulfate initiator is preferably 0.1 parts by mass to 20 parts by mass (for example, 0.1 parts by mass to 10 parts by mass).

Examples of the cation polymerization initiator include a thermal acid generating initiator or a photoacid generating initiator in which the polymerization initiator is decomposed by heat or light to generate Lewis acid or Bronsted acid. From the viewpoint of maintaining superior smoothness, a photoacid generating initiator is preferable.

Examples of the thermal acid generating initiator include an onium salt type acid generator obtained from a combination of a cation portion and an anion portion, the cation portion being, for example, a complex ion such as a sulfonium salt, a diazonium salt, an ammonium salt, a phosphonium salt, an iodonium salt, or a sulfoxonium salt, and the anion portion being, for example, a chloride ion (Cl—) or a bromide ion (Br$^-$).

As the thermal acid generating initiator, a commercially available product can be used, and examples thereof include: Cl-2624 and Cl-2855 (both of which are manufactured by Nippon Soda Co., Ltd.); SI-60, SI-60L, SI-80, SI-80L, SI-100, SI-100L, SI-145, SI-150, SI-160, SI-180, and SI-180L (all of which are manufactured by Sanshin Chemical Industry Co., Ltd.); TA-90, TA-100, TA-120, TA-160, IK-1, and IK-2 (all of which are manufactured by San-Apro Ltd.); and ADEKA OPTON CP-66 and ADEKA OPTON CP-77 (both of which are manufactured by ADEKA Corporation).

Examples of the photoacid generating initiator include an onium salt type acid generator obtained from a onium combination of a cation portion and an anion portion, the cation portion being, for example, a complex ion such as a sulfonium salt, a diazonium salt, an ammonium salt, an iodonium salt, a thioxanthonium salt, a selenonium salt, a thianthrenium salt, or an iron complex salt, and the anion portion being, for example, a chloride ion (Cl$^-$), a bromide ion (Br$^-$), tetrafluoroborate (BF$_4^-$), hexafluorophosphate (PF$_6^-$), hexafluoroantimonate (SbF$_6^-$), hexafluoroarsenate (AsF$_6^-$), or hexachloroantimonate (SbCl$_6^-$).

As the photoacid generating initiator, a commercially available product can be used, and examples thereof include: CD1010 (manufactured by Sartomer Co., Inc.); WPAG-281, WPAG-336, WPAG-367, and WPI-113 (all of which are manufactured by Wako Pure Chemical Industries Ltd.); IPTX, C1-5102, and C1-2855 (both of which are manufactured by Nippon Soda Co., Ltd.); UVI-6970 and UVI-6974 (all of which are manufactured by Union Carbide Corporation); RHODORSIL Photoinitiator 2074 (manufactured by Rhone-Poulenc Rorer Inc.); IRGACURE 250 (manufactured by BASF Japan Ltd.), SP-150, SP-151, SP-152, SP-170, SP-171, and SP-172 (all of which are manufactured by ADEKA Corporation); and CPI-100P, CPI-101A, and CPI-210S (all of which are manufactured by San-Apro Ltd.).

Examples of the azo-based initiator, the peroxide initiator, or the persulfate initiator include benzoyl peroxide, p-chlorobenzoyl peroxide, diisopropyl peroxycarbonate, di-2-ethylhexyl peroxycarbonate, tert-butyl peroxypivalate, 1,1'-azobis cyclohexane-1-carbonitrile, 2,2'-azobis-(2,4-dimethyl valeronitrile), 2,2'-azobis-(4-methoxy-2,4-dimethyl valeronitrile), 2,2'-azobis-(methyl isobutyrate), α,α-azobis-(isobutyronitrile), and 4,4'-azobis(4-cyanovaleric acid).

Examples of the leveling agent include a silicon leveling agent, an acrylic leveling agent, a fluorine-based leveling agent, and a vinyl-based leveling agent, and a commercially available product can be used. As the leveling agent, a silicon leveling agent is preferably used. It is presumed that the leveling agent has a surface adjusting function of exhibiting a defoaming effect to reduce the friction coefficient of a surface of the cured resin layer in the step of forming the resin layer by casting the composition containing the bifunctional alicyclic epoxy onto the undercoat primer layer and curing the composition. The proportion of the leveling agent is 0 parts by mass to 5 parts by mass (for example, 0 parts by mass to 3 parts by mass) with respect to 100 parts by mass of the epoxy. When the amount of the leveling agent is excessively large, the friction coefficient and peeling resistance of the obtained sliding member deteriorate.

As the silicon leveling agent, a commercially available product can be used, and examples thereof include: DC11PA, ST80PA, DC3074, DC3037, and SR2402 (all of which are manufactured by Dow Corning Toray Co., Ltd.); KP-321, KP-324, KP-327, KR-9218, and X-40-9220 (all of which are manufactured by Shin-Etsu Chemical Co., Ltd.); TSR165 and XR-31B1763 (both of which are manufactured by Toshiba Silicon K.K.); BYK-341, BYK-344, BYK-306, BYK-307, BYK-325, BYK-315, BYK-320, BYK-322, BYK-323, BYK-300, BYK-302, BYK-330, BYK-333, BYK-335, BYK-370, BYK-SILCLEAN3700, and BYK-SILCLEAN3720 (all of which are manufactured by BYK-Chemie Japan K.K.); DISPARLON1711, 1751N, 1761, LS-001, and LS-050 (all of which are manufactured by Kusumoto Chemicals Ltd.); and POLYFLOW KL-400HF, KL-401, KL-402, KL-403, and KL-404 (all of which are manufactured by Kyoeisha Chemical Co., Ltd.).

As the acrylic leveling agent, a commercially available product can be used, and examples thereof include: BYK-350, BYK-352, BYK-354, BYK-355, BYK-358N, BYK-361N, and BYK-392 (all of which are manufactured by BYK-Chemie Japan K.K.); DISPARLONLF-1980, LF-1982, LF-1983, LF-1984, LF-1985, and NSH-8430HF (all of which are manufactured by Kusumoto Chemicals Ltd.); and POLYFLOW No. 50 EHF, No. 54N, No. 55, No. 77, No. 85HF, No. 90, No. 90D-50, No. 95, and No. 99C (all of which are manufactured by Kyoeisha Chemical Co., Ltd.).

Examples of the fluorine-based leveling agent include BYK-340 (trade name, manufactured by BYK-Chemie Japan K.K.). Examples of the vinyl-based leveling agent include DISPARLONLHP-90 and LHP-91 (both of which are manufactured by Kusumoto Chemicals Ltd.).

In the step of forming the undercoat primer layer on the sliding surface of the metal substrate according to the embodiment of the invention, the undercoat primer layer may be formed by casting the undercoat primer onto the sliding surface of the metal substrate and heating the undercoat primer and/or irradiating the undercoat primer with light, for example, UV rays.

When the undercoat primer is cast onto the sliding surface of the metal substrate, a well-known cast coating method for obtaining a uniform coating layer by casting, for example, roll coating, brush coating, or die coating, wire bar coating, and a coater may be used. As the coater, a wire bar coater may be preferably used in which wire is densely wound around a core to obtain a uniform cast coating layer.

Next, in order to form the undercoat primer layer by heating and/or irradiation with light, for example, UV rays, the cast undercoat primer may be cured by being heated at a temperature of about 100° C. to 150° C. for about 0.1 minutes to 10 minutes (typically, about 1 minute) and, preferably, further being irradiated with UV rays under irradiation conditions of about 100 mJ/cm$^2$ to 800 mJ/cm$^2$. As a result, an undercoat primer layer having a thickness of, preferably, 0.2 μm to 5 μm (for example, 0.2 μm to 3 μm; typically, about 2 μm) may be formed. A part of the curing of the undercoat primer may be performed by heating and/or irradiation with light, for example, UV rays in order to form the resin layer in the subsequent step.

In the embodiment of the invention, the composition layer containing the bifunctional alicyclic epoxy and the polymerization initiator, or the composition layer containing the bifunctional alicyclic epoxy, the polymerization initiator, and the leveling agent is provided on the undercoat primer layer. From the viewpoint of handleability, it is preferable that the composition is liquid at room temperature. The composition layer may contain the leveling agent. In the step of providing the composition layer on the undercoat primer layer, a well-known cast coating method for obtaining a uniform coating layer by casting, for example, roll coating, brush coating, or die coating, wire bar coating, and a cast coater may be used. As the cast coater, a wire bar coater may be preferably used in which wire is densely wound around a core to obtain a uniform coating layer.

In the embodiment of the invention, when the composition layer is cured to form the resin layer, curing conditions may be appropriately selected depending on the kind of the polymerization initiator to be used. For example, in order to form the resin layer, the composition may be cured by a curing treatment, for example: (1) heating; (2) heating→irradiation with light, for example, UV rays; or (3) acid generation by the polymerization initiator being decomposed by heating or irradiation with light, for example, UV rays→heating. The heating may be performed, for example, in a temperature range of 80° C. to 200° C. (for example, 125° C. to 200° C. or 125° C. to 175° C.) for 10 minutes to 5 hours (for example, 30 minutes to 2 hours). The irradiation with light, for example, UV rays may be performed under irradiation conditions of 200 mJ/cm$^2$ to 1000 mJ/cm$^2$ (for example, 200 mJ/cm$^2$ to 500 mJ/cm$^2$). The heating may be performed at the same temperature for the heating time or may be performed at different temperatures for the heating time. In the latter case, initial heating may be performed at 80° C. to 125° C. for about 0.1 minutes to 5 minutes, and post heating may be performed at 125° C. to 200° C. for about 30 minutes to 2 hours. In either case, as the temperature increases, the heating time can be reduced. In the embodiment of the invention, it is preferable that the photoacid generating initiator is used as the polymerization initiator and that the composition layer is cured through heating→acid generation by the polymerization initiator being decomposed by irradiation with light, for example, UV rays→additional heating, thereby forming the resin layer.

Using the above-described method of manufacturing a sliding member, an epoxy resin-based sliding member having a low friction coefficient can be obtained. In the sliding member, the smoothness of a surface is superior. For example, Ra indicating surface roughness is 0.05 μm or less, in particular, 0.03 μm or less. Moreover, the friction coefficient is low. For example, in a friction test at 4 Hz and 16 Hz for about 5 minutes, the friction coefficient of the sliding member is ranked as B or higher based on the following evaluation criteria: rank A (friction coefficient: 0.1 or lower), rank B (friction coefficient: 0.1 to 0.15), and rank C (friction coefficient: 0.15 or higher). That is, a low friction coefficient which is equal to or close to that of the DLC-based sliding member is exhibited. Therefore, the sliding member is preferably applicable to a piston skirt portion, a roller rocker portion, a chain damper portion, a cam nose portion, a valve lifter portion, or a cam bearing portion of an internal combustion engine.

Hereinafter, examples of the invention will be described. The following examples are shown for comparison between the sliding member according to the invention and a sliding member which is outside of the scope of the invention and do not limit the invention.

Figures 12, 13:
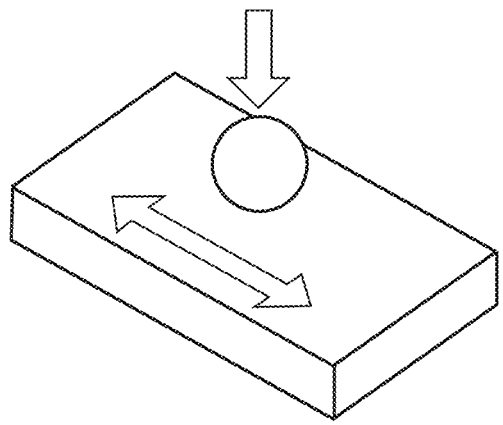
FIG. 12 is a schematic view showing a testing machine for measuring a friction coefficient regarding the samples.
FIG. 13 is a table showing the results of measuring a surface roughness before the friction test regarding each of the samples.

For comparison between the performances of sliding members, each of the following examples was evaluated according to the following measurement method using a TE77 type high-frequency friction machine shown in a schematic view of FIG. 12.

[Test Conditions]

The test was performed under the following conditions of load: 10 N, amplitude: 10 mm, respective bounce frequencies: 4 Hz, 16 Hz, and 20 Hz, lubricant: 5 W-30 base oil, oil temperature: 80° C., and test time: 400 seconds. The obtained temporal change in the friction coefficient is shown in a graph, and the average value is obtained as the friction coefficient of the measurement sample. The evaluation criteria of the friction coefficient were rank A: 0.1 or lower, rank B: 0.1 to 0.15, and rank C: 0.15 or higher, and ranks A and B were set as "Acceptable". With a roughness measurement method defined in JIS B 0681-6, Ra, Ry, and Rz were measured using a laser microscope (KEYENCE VK-X) at 9 points regarding a sample before the friction test and a sample after the friction test. The sample before the friction test and the sample after the friction test were compared to each other. In this comparison, a case where no change was found on a sliding friction surface (the change value was the maximum value Ry or lower) was shown as "0". In addition, when the depth of a concave portion on the sliding friction surface is Ry or greater and the thickness of a film or less, a case where the depth of the concave portion on the sliding friction surface is greater than the thickness of the film was shown as "Peeling", and a case where a convex shape is present due to plastic deformation of the sliding friction surface is shown as "*".

Reference Examples 1 and 2

100 parts by mass of 3,4,3',4'-diepoxybicyclohexyl as a bifunctional alicyclic epoxy resin; 0 parts by mass (Reference Example 1) or 5 parts by mass (Reference Example 2) of BYK-Silclean 3720 (solid content: 25 mass %; manufactured by BYK-Chemie Japan K.K.) as a silicon leveling agent; and 3 parts by mass of CPI-210S (photoacid generator; 100 parts by mass of non-volatile components; manufactured by San-Apro Ltd.) as a polymerization initiator were mixed with each other to prepare a mixed solution. This mixed solution was set as a hard coating solution (curing composition).

Comparative Reference Examples 1 and 2

100 parts by mass of a bifunctional acrylate resin IRR-214-K (manufactured by Daicel-Allnex Ltd.) instead of the epoxy resin; 5 parts by mass (Comparative Reference Example 1) or 10 parts by mass (Comparative Reference Example 2) of EB1360 (silicon acrylate; manufactured by Daicel-Allnex Ltd.) as a silicon leveling agent; and 3 parts by mass of IRGACURE 184 (radical initiator; manufactured by BASF Japan Ltd.) as a polymerization initiator were mixed with each other to prepare a mixed solution. This mixed solution was set as a hard coating solution (curing composition).

Example 1

Figure 14:
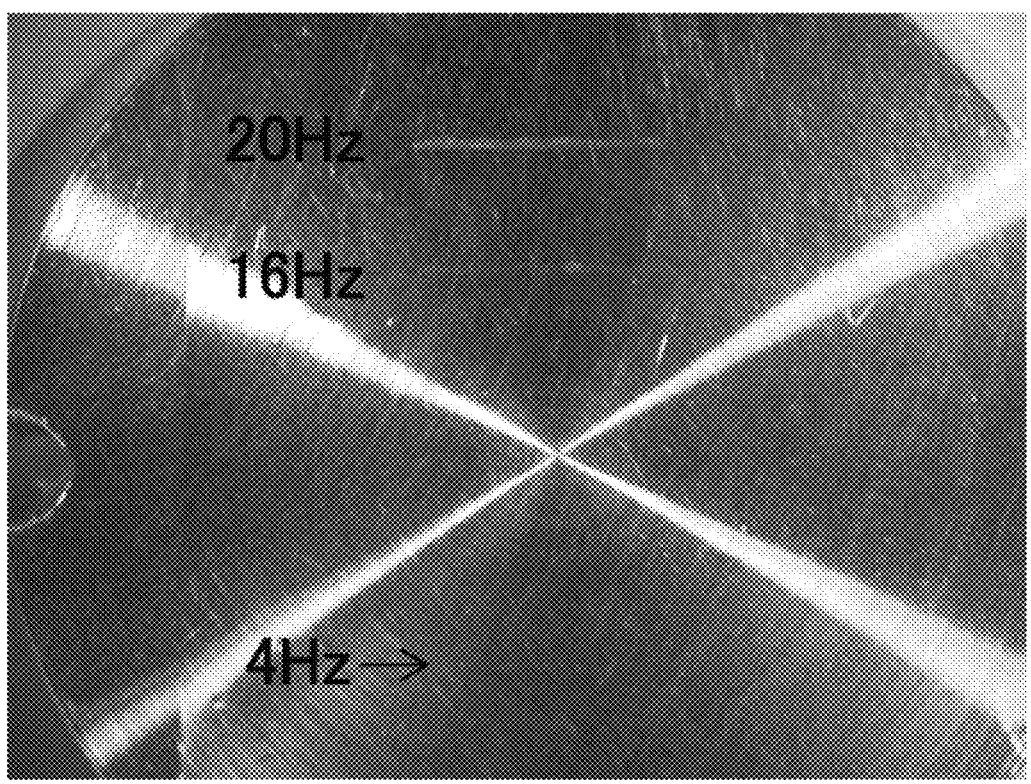
FIG. 14 is a copy of a surface image of a sample of Example 1 after evaluation of wear resistance.

RAYMAGIC 07 (manufactured by Kanae Paint Co., Ltd.) was cast onto a single surface of an aluminum plate (mirror surface) using a wire bar (No. 3). Next, the aluminum plate was left to stand in an oven at 100° C. for 1 minute and then was irradiated with UV rays under irradiation conditions: 400 mJ/cm$^2$. As a result, an undercoat primer layer having a thickness of about 2 μm was formed. Next, the hard coating solution of Reference Example 1 was cast onto the primer layer side using a wire bar (No. 30). Next, the aluminum plate was left to stand in an oven at 100° C. for 1 minute, was irradiated with UV rays under irradiation conditions: 400 mJ/cm$^2$, and was heated at 150° C. for 1 hour. As a result, a coating film of the hard coating solution was cured, and an aluminum substrate including an undercoat primer layer having a thickness of about 2 μm and a hard coating layer (resin layer) having a thickness of 41 μm was prepared. Regarding the obtained sample, the measurement of the surface roughness and the friction test were performed. The friction coefficients were 0.1 (rank A) at 4 Hz, 0.08 (rank A) at 16 Hz, and 0.11 (rank B) at 20 Hz. FIGS. 2 to 4 show the results of measuring a friction coefficient together with other results. A table of FIG. 5 shows the results of evaluating peeling resistance after the friction test together with other results. A table of FIG. 13 shows the results of measuring the surface roughness of the sample before the friction test together with other results. FIG. 14 shows a copy of a surface image of the sample after the friction test.

Example 2

Figure 15:
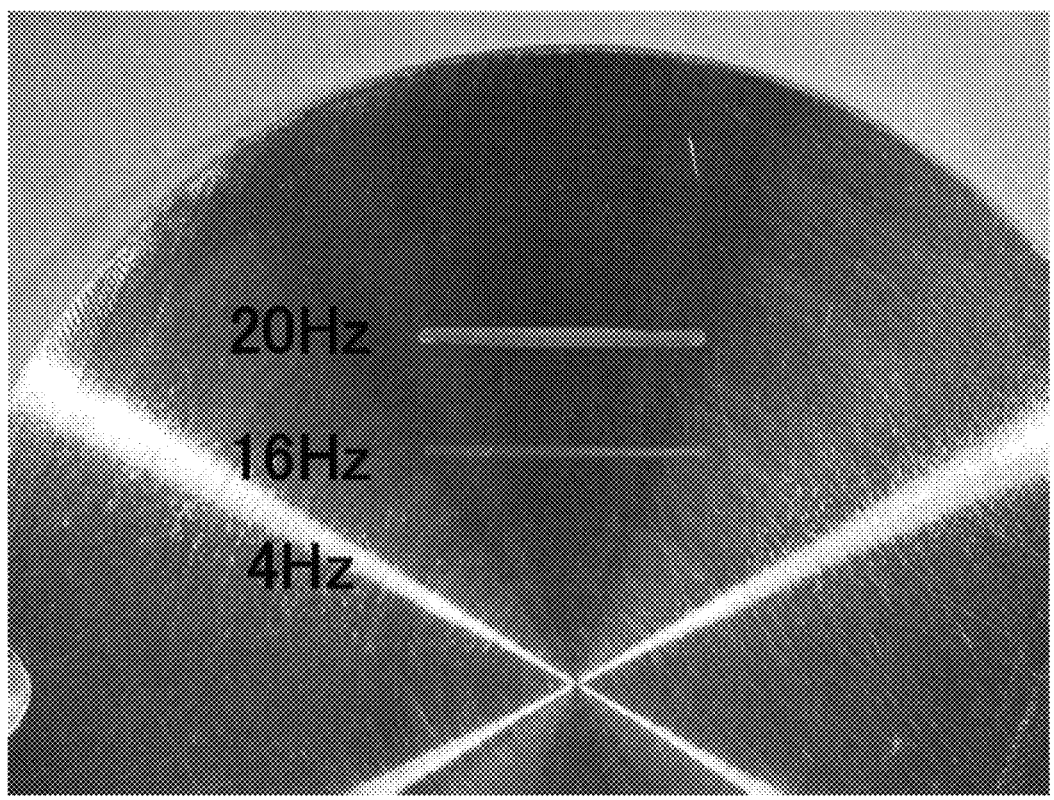
FIG. 15 is a copy of a surface image of a sample of Example 2 after evaluation of wear resistance.

An aluminum plate including an undercoat primer layer having a thickness of about 2 μm and a hard coating layer having a thickness of 41 μm was prepared using the same method as in Example 1, except that the hard coating solution of Reference Example 2 was cast instead of the hard coating solution of Reference Example 1. Regarding the obtained sample, the measurement of the surface roughness and the friction test were performed. The friction coefficients were 0.09 (rank B) at 4 Hz, 0.13 (rank B) at 16 Hz, and 0.15 (rank C) at 20 Hz. FIGS. 2 to 4 show the results of measuring a friction coefficient together with other results. The table of FIG. 5 shows the results of evaluating peeling resistance after the friction test together with other results. The table of FIG. 13 shows the results of measuring the surface roughness of the sample before the friction test together with other results. FIG. 15 shows a copy of a surface image of the sample after the friction test.

Comparative Example 1

Figure 16:
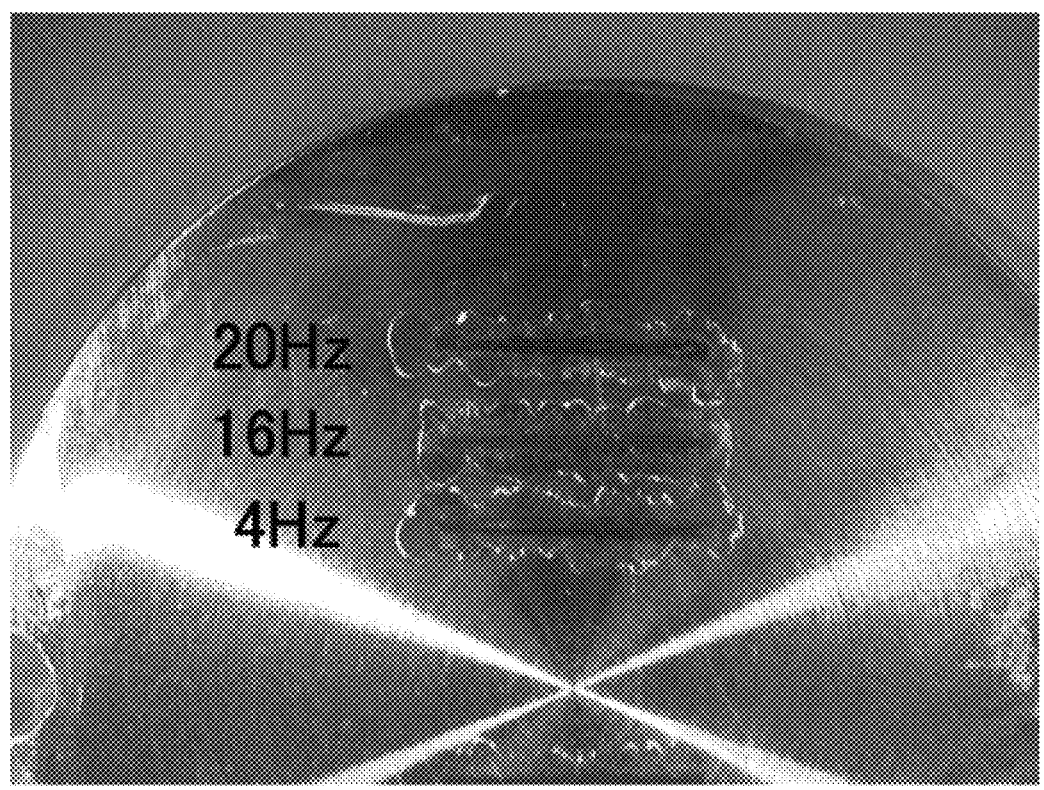
FIG. 16 is a copy of a surface image of a sample of Comparative Example 1 after evaluation of wear resistance.

An undercoat primer layer was formed on a single surface of an aluminum plate (mirror surface) using the same method as in Example 1. Next, an aluminum plate including an undercoat primer layer having a thickness of about 2 μm and a hard coating layer (resin layer) having a thickness of 40 µm was prepared using the same method as in Example 1, except that the hard coating solution of Comparative Reference Example 1 was used instead of the hard coating solution of Reference Example 1. Regarding the obtained sample, the measurement of the surface roughness and the friction test were performed. The friction coefficients were 0.20 (rank C) at 4 Hz, 0.16 (rank C) at 16 Hz, and 0.14 (rank B) at 20 Hz. FIGS. 2 to 4 show the results of measuring a friction coefficient together with other results. The table of FIG. 5 shows the results of evaluating peeling resistance after the friction test together with other results. The table of FIG. 13 shows the results of measuring the surface roughness of the sample before the friction test together with other results. FIG. 16 shows a copy of a surface image of the sample after the friction test.

Comparative Example 2

Figure 17:
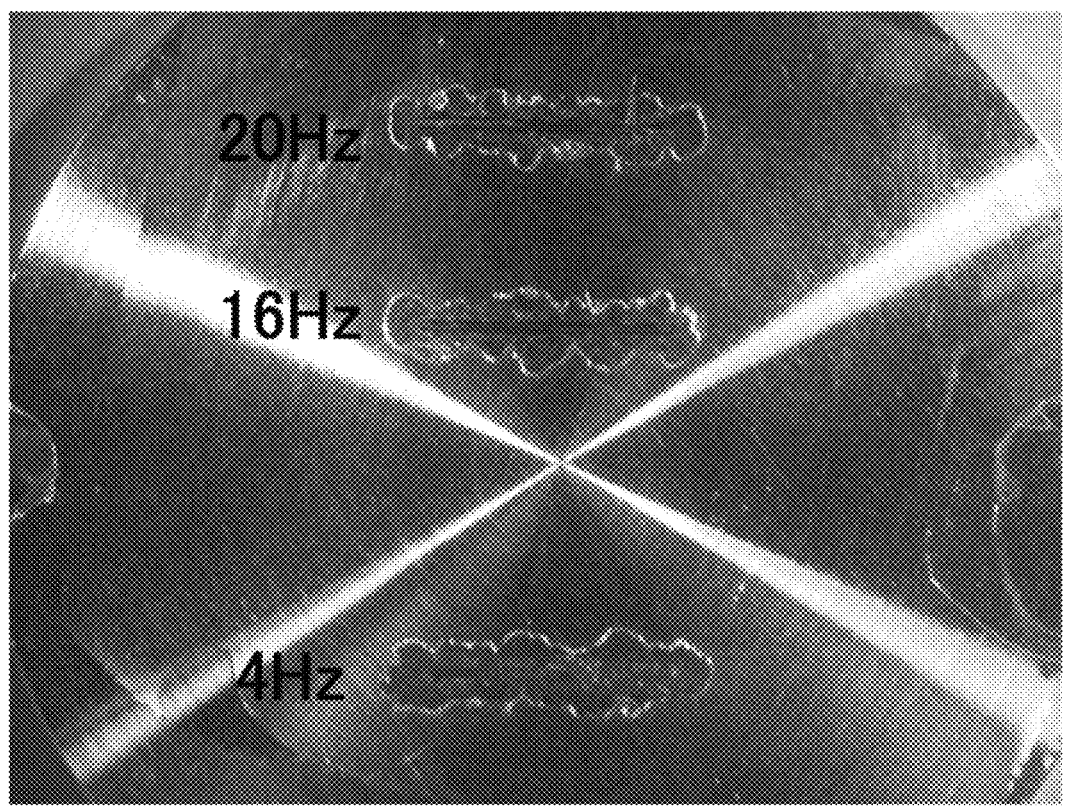
FIG. 17 is a copy of a surface image of a sample of Comparative Example 2 after evaluation of wear resistance.

An undercoat primer layer was formed on a single surface of an aluminum plate (mirror surface) using the same method as in Example 1. Next, an aluminum substrate including an undercoat primer layer having a thickness of about 2 µm and a hard coating layer (resin layer) having a thickness of 40 µm was prepared using the same method as in Example 1, except that the hard coating solution of Comparative Reference Example 2 was used instead of the hard coating solution of Reference Example 1. Regarding the obtained sample, the measurement of the surface roughness and the friction test were performed. The friction coefficients were 0.18 (rank C) at 4 Hz, 0.16 (rank C) at 16 Hz, and 0.15 (rank C) at 20 Hz. FIGS. 2 to 4 show the results of measuring a friction coefficient together with other results. The table of FIG. 5 shows the results of evaluating peeling resistance after the friction test together with other results. The table of FIG. 13 shows the results of measuring the surface roughness of the sample before the friction test together with other results. FIG. 17 shows a copy of a surface image of the sample after the friction test.

Comparative Examples 3 to 6

Figure 18:
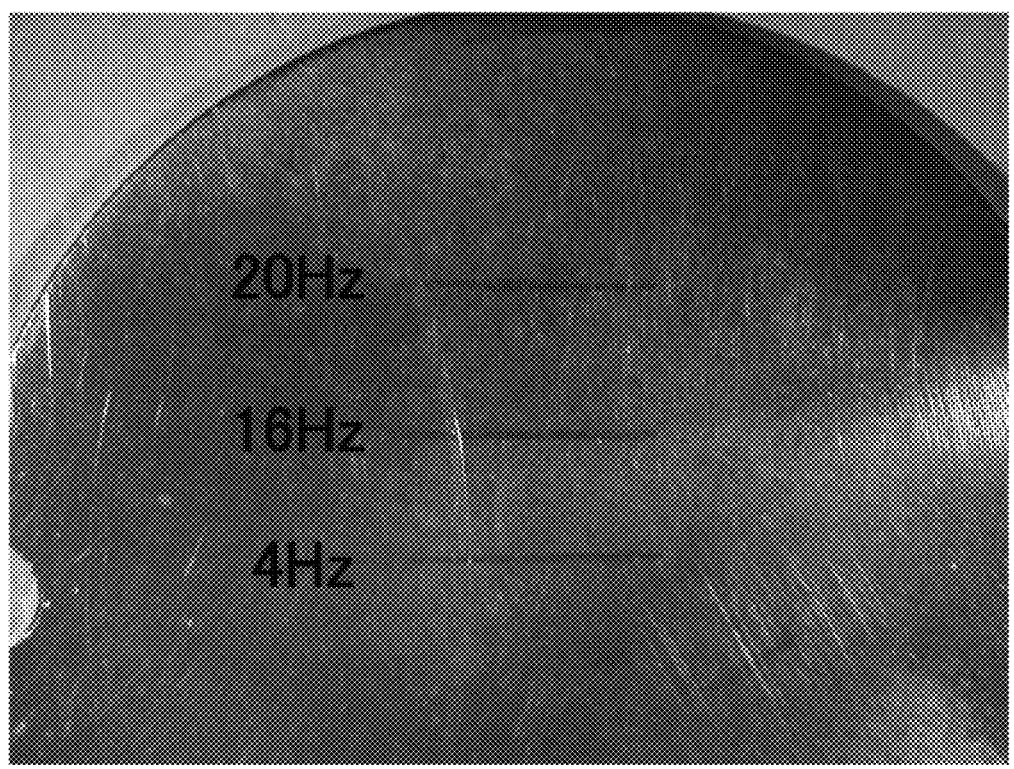
FIG. 18 is a copy of a surface image of a sample of Comparative Example 3 after evaluation of wear resistance.
Figure 19:
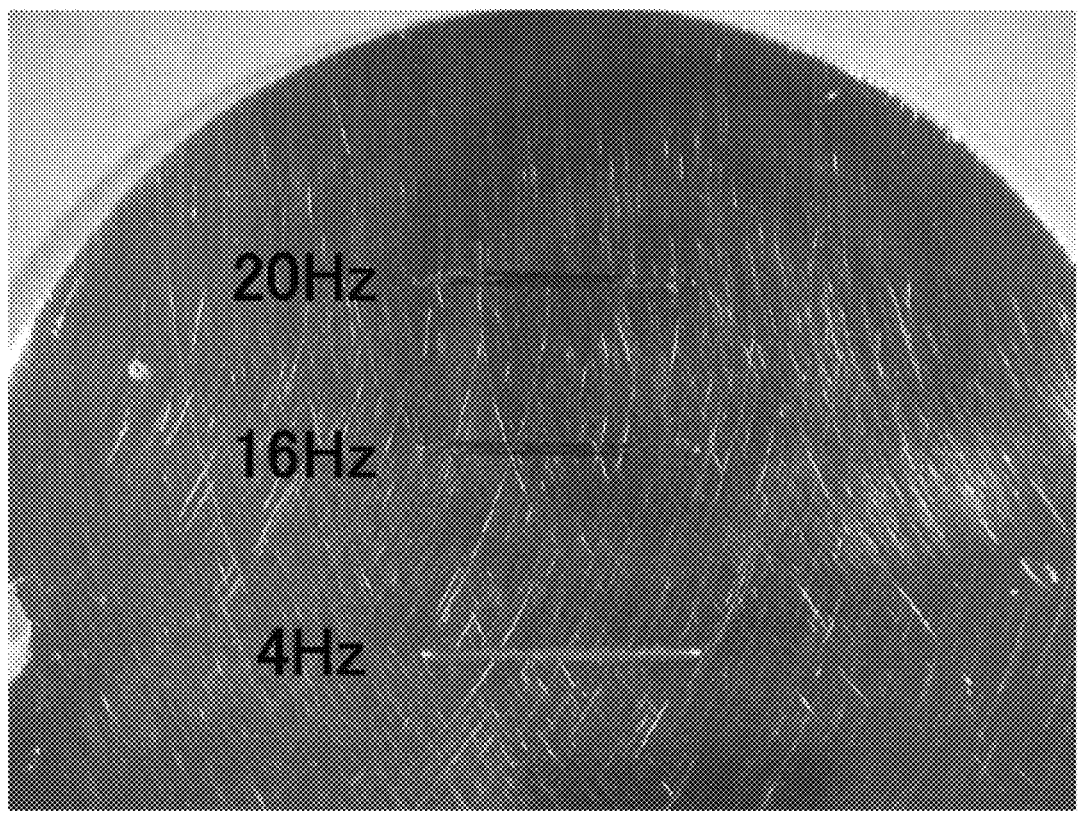
FIG. 19 is a copy of a surface image of a sample of Comparative Example 4 after evaluation of wear resistance.
Figure 20:
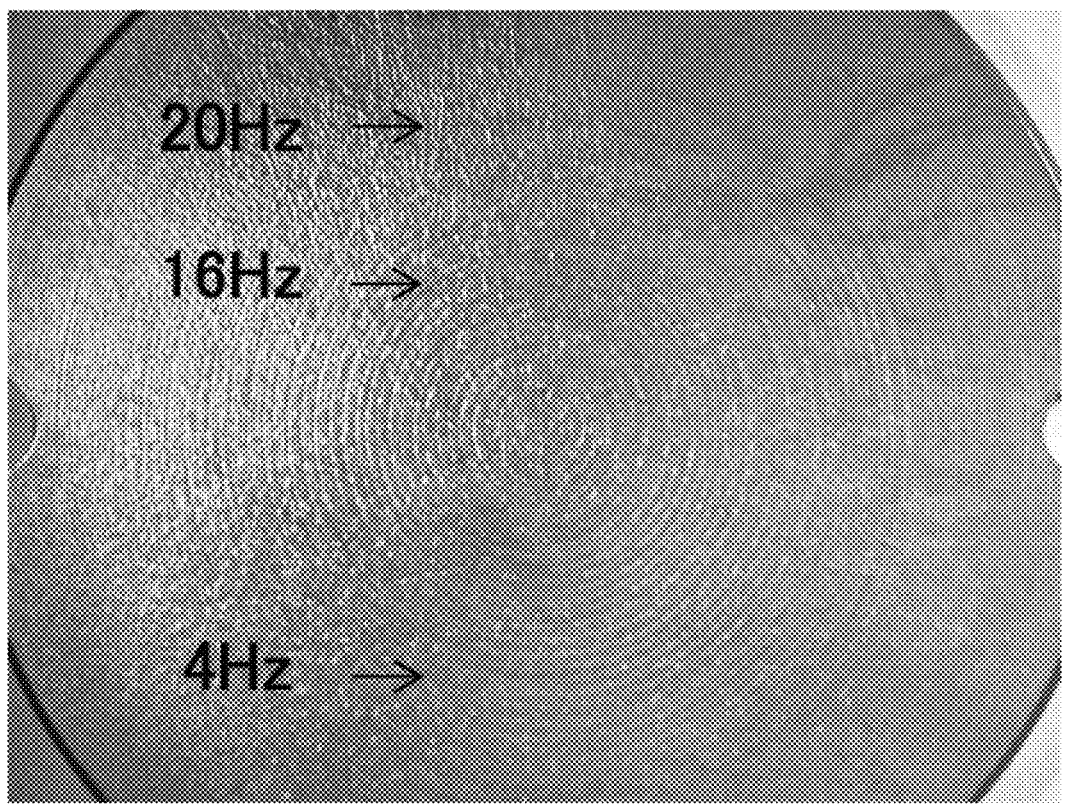
FIG. 20 is a copy of a surface image of a sample of Comparative Example 5 after evaluation of wear resistance.
Figure 21:
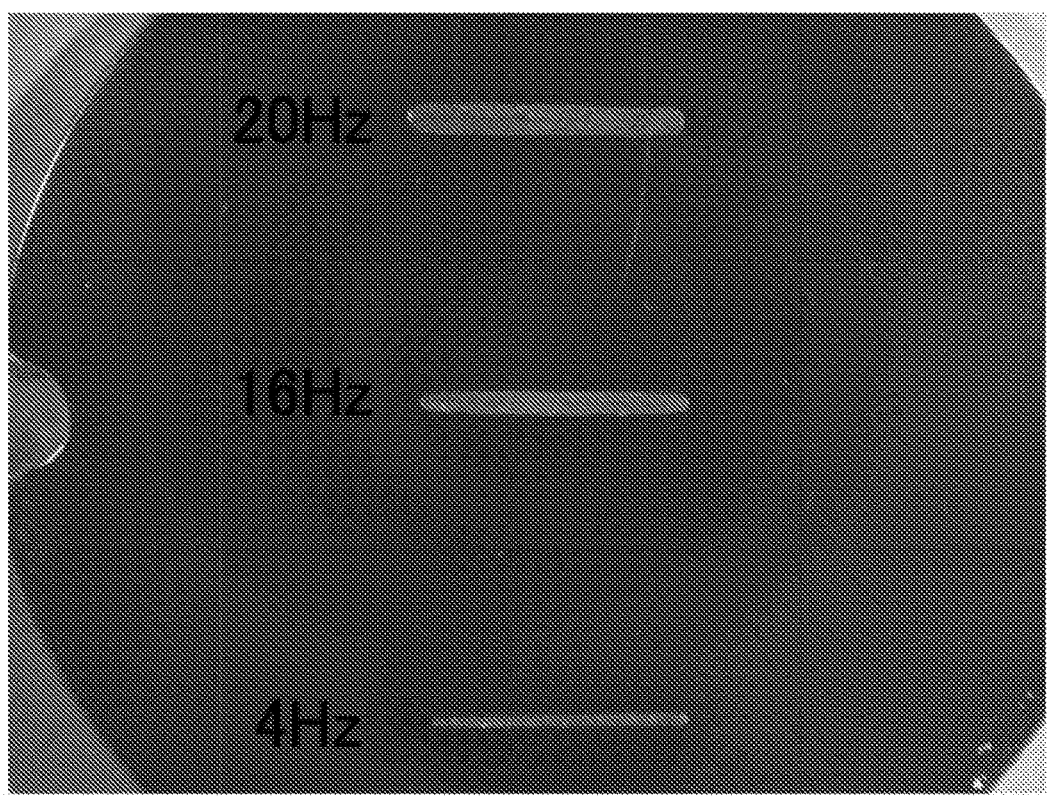
FIG. 21 is a copy of a surface image of a sample of Comparative Example 6 after evaluation of wear resistance.

An Al plate as a metal substrate underwent degreasing→aerolapping→washing→DLC treatment to prepare an Al-DLC-based sliding member (Comparative Example 3). An Al mirror surface as the metal substrate was prepared (Comparative Example 4). An Fe plate as a metal substrate underwent degreasing→glass bead shot peening→aerolapping→washing→DLC treatment to prepare an Fe-DLC-based sliding member (Comparative Example 5). An Fe substrate as the metal substrate was prepared (Comparative Example 6). Regarding these samples, the friction coefficient and the peeling resistance after the friction test were evaluated. In the DLC treatment, unbalanced magnetron sputtering (UBMS) was used, solid carbon was used as a film-forming material, and carbon containing Cr, W, and Si was sputtered as an undercoat before sputtering of solid carbon. The mirror surface was prepared by grinding. FIGS. 2 to 4 show the results of measuring a friction coefficient together with other results. The table of FIG. 5 shows the results of evaluating peeling resistance after the friction test together with other results. The table of FIG. 13 shows the results of measuring the surface roughness of the sample before the friction test together with other results. FIGS. 18 (Comparative Example 3), 19 (Comparative Example 4), 20 (Comparative Example 5), and 21 (Comparative Example 6) show copies of surface images of the samples after the friction test, respectively.

As clearly seen from FIGS. 2 to 4, in the sliding members obtained in Examples 1 and 2, the friction coefficients at 4 Hz and 16 Hz were lower than those of the two polyfunctional acrylate resin-based sliding members. As clearly seen from FIG. 5, in the sliding members obtained in Examples 1 and 2, the peeling of the resin layer after the friction test was not found unlike the sliding members obtained in Comparative Examples 1 and 2. As clearly seen from FIG. 13, in the sliding members obtained in Examples 1 and 2, the smoothness of a surface was superior.

According to the invention, an epoxy resin-based sliding member having a low friction coefficient, which can be used in an internal combustion engine such as an engine of an automobile, can be obtained.

What is claimed is:

1. A sliding member comprising:
   a metal substrate;
   an undercoat primer layer that is provided on a sliding surface of the metal substrate; and
   a resin layer that is provided on the undercoat primer layer, the resin layer being obtained by curing a composition layer containing a bifunctional alicyclic epoxy in an amount of 80% by weight or more and a polymerization initiator,
   wherein the metal substrate is a part of a portion of an internal combustion engine.

2. The sliding member according to claim 1, wherein the bifunctional alicyclic epoxy is 3,4,3',4'-diepoxybicyclohexyl represented by the following formula:

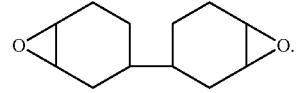

3. The sliding member according to claim 1, wherein the resin layer further contains a leveling agent.

4. The sliding member according to claim 3, wherein a proportion of the leveling agent is 5 parts by mass or lower with respect to 100 parts by mass of the bifunctional alicyclic epoxy.

5. The sliding member according to claim 1, wherein the metal substrate is formed of aluminum, iron, an aluminum alloy or an iron alloy.

6. The sliding member according to claim 1, wherein the undercoat primer layer has a thickness of 0.2 µm to 5 µm.

7. The sliding member according to claim 1, wherein the undercoat primer layer contains an epoxy resin.

8. The sliding member according to claim 1, wherein the polymerization initiator is a photoacid generator.

9. The sliding member according to claim 1, wherein the sliding member is a piston skirt portion, a roller rocker portion, a chain damper portion, a cam nose portion, a valve lifter portion, or a cam bearing portion of an internal combustion engine.

10. The sliding member according to claim 1, wherein the composition layer consists of the bifunctional alicyclic epoxy and the polymerization initiator.

11. The sliding member according to claim 1, wherein the composition layer consists of the bifunctional alicyclic epoxy, the polymerization initiator, and a leveling agent.

12. A method of manufacturing a sliding member comprising:

forming an undercoat primer layer on a sliding surface of a metal substrate, wherein the undercoat primer layer comprises an epoxy resin as a main component;

providing a composition layer containing a bifunctional alicyclic epoxy in an amount of 80% by weight or more and a polymerization initiator on the undercoat primer layer; and curing the composition layer to form a resin layer.

13. The method of manufacturing a sliding member according to claim 12, wherein the composition layer consists of the bifunctional alicyclic epoxy and the polymerization initiator.

14. The method of manufacturing a sliding member according to claim 12, wherein the composition layer consists of the bifunctional alicyclic epoxy, the polymerization initiator, and a leveling agent.

* * * * *